Jan. 15, 1957  F. IMHOFF  2,777,227
PIVOTALLY CONNECTED BAR TYPE GATE
Filed Sept. 9, 1954
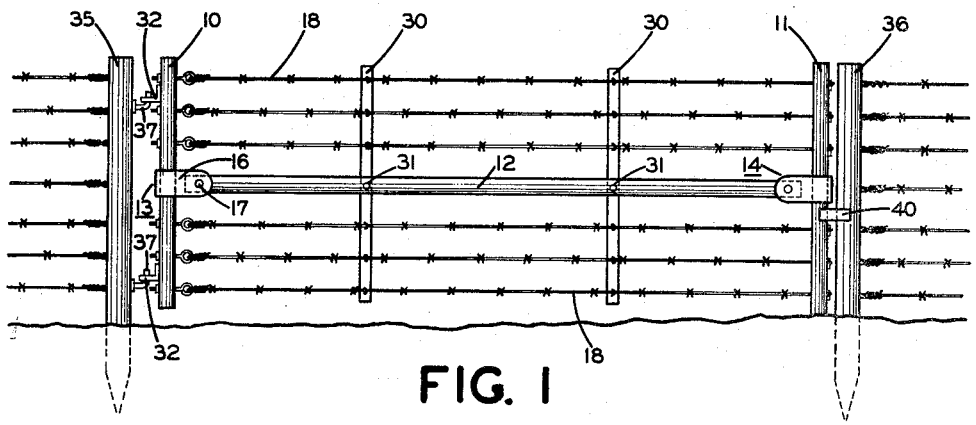
FIG. 1
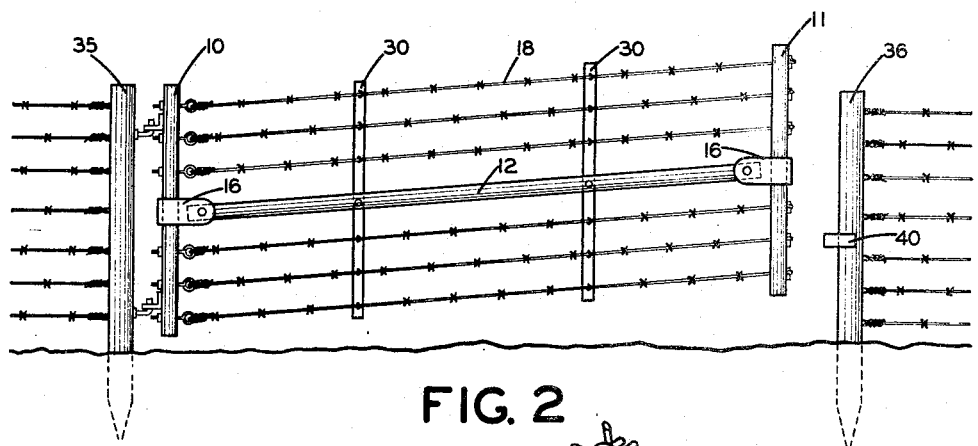
FIG. 2
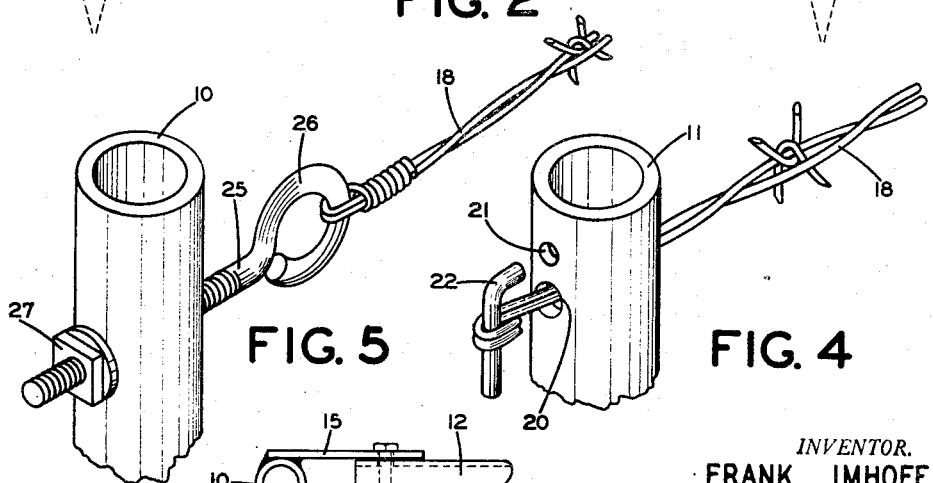
FIG. 5
FIG. 4
FIG. 3
*INVENTOR.*
FRANK IMHOFF
BY
*Eber J. Hyde*
ATTORNEY

United States Patent Office 2,777,227
Patented Jan. 15, 1957

2,777,227

PIVOTALLY CONNECTED BAR TYPE GATE

Frank Imhoff, Shiloh, Ohio

Application September 9, 1954, Serial No. 454,907

3 Claims. (Cl. 39—87)

This invention pertains to a gate and more particularly to a farm gate.

In the past farm gates have been made very rigid and as a consequence the gate post must be made large and must extend far into the ground. The reason for this is that the outer or free end of the gate usually clears the ground by two or three inches so that the outer end of the gate can swing freely. The post to which the gate is hung is usually about 4 feet high with the two hinges being located 1 foot and 3 feet above the ground. If this post leans over only about ¾ of an inch the end of a 12 foot gate is going to drag on the ground. If it leans over any more than the ¾ of an inch part of the weight of the gate is supported on the ground. Once the outer end of the gate rests on the ground a person opening the gate must not only pick up substantially the full weight of the gate but he must also tilt the gate post back into its original upright position or he must distort the rigid frame of the gate. In any event, once the post begins to sag it is a difficult task involving lifting and swinging to open the gate.

In the past this difficulty has been combated by making gates more and more rigid, and by making the gate post bigger and longer and by sinking the gate post in concrete. This of course greatly increases the cost, and merely postpones the inevitable.

The present invention accepts the inevitable, and makes use of the tendency of a gate to sag, and as a consequence, results in a light weight gate hung on a light weight, easy to drive gate post. The gate frame and post are so permanent due to this invention that it has been considered desirable to provide means for easily replacing the barbed wire which may form part of the gate. Thus, the gate frame and the gate post may last a lifetime.

Several forces are applied to the gate post by a gate which hangs on the post and is not otherwise supported. One force is, of course, the weight of the gate which hangs on the post. This force is not of much consequence since it acts almost straight down the post. The second force, and by far the most harmful one to the post, is the one applied to the post when the outer end of the gate is not supported from the ground by a wheel or the like. This second force is the one most likely to result in a weak, wobbly post since it is applied to the post in such a manner that it tries to push the lower hinge toward the post, and tries to pull the upper hinge away from the post. The result is a force couple, or moment, attempting at all times to pull the post over. This force couple is acting on the post even though the gate is not being swung open or shut. The force applied to the post by this force couple greatly exceeds the dead weight of the gate. For example, if a swinging gate with a 12 foot span weighs 30 lbs., and is hung on a post from 2 hinges, one 1 foot above the ground and the other 3 feet above the ground, and assuming that each hinge supports one half the weight of the gate, a force of nearly 200 foot lbs. will be applied tending to pull the gate over.

In the past attempts have been made to reduce this force couple by connecting wheels, rollers etc. to the other end of the gate. This of course increases the cost of the gate and increases maintenance.

It is an object of the present invention to provide a gate, particularly a farm gate, which is light in weight, easy to handle, and which does not apply to the gate post a high force couple or moment tending to pull over the gate post.

Another object of the invention is to provide a gate which will stay in the position in which it is placed, whether the position be "open," "closed" or inbetween.

A further object of the invention is to provide a gate which can be sold in a disassembled condition, and which the purchaser can easily assemble.

Still another object of the invention is to provide a gate which can be sold in a disassembled, partially completed condition, and which the purchaser can assemble by providing only one major item of the gate, this one item which is provided by the purchaser determining the length of the gate. Accordingly, the gate of this invention can be tailor-made to fit any size opening in a fence, and the purchaser of the gate can easily make the one part necessary to determine the length of the gate.

Another object of the invention is to provide a gate which is made of only a few light-weight rigid members, the balance being made of barbed wire which can easily be replaced if it rusts.

Other objects and a fuller understanding of the present invention will be had by reference to the following description taken in connection with the accompanying drawings, and its scope will be pointed out in the appended claims.

With reference to the drawings—

Figure 1 shows a plan view of the gate of the present invention in its "closed" position, Figure 2 is a plan view of the gate in the raised position prior to swinging it open, Figure 3 is an enlarged view looking down on a portion of the gate, Figure 4 is an enlarged detailed isometric view showing the preferred means for attaching one end of the barbed wire to one of the gate posts, and Figure 5 is an enlarged detailed isometric view showing the preferred means for attaching the other end of the barbed wire to the other gate post.

The gate of this invention in its preferred form comprises an H-shaped frame made of two spaced apart rigid upright members 10 and 11 and a rigid cross member 12. Each of these three members may be made of standard round or square pipe, channel, etc., for example, round pipe 1 to 2 inches in diameter.

Means 13 and 14 are provided for pivotally connecting each of the two ends of the cross member 12 to one of the uprights. As shown, particularly in Figure 3, each of the connection means is a pair of spaced plates 15, 16 welded to one of the upright members 10 and positioned on opposite sides of the horizontal member 12. A bolt 17 extends through holes in plates 15 and 16, and through a hole in the horizontal member 12 so that the bolt serves as a pivot permitting relative angular motion of the horizontal member 12 with respect to the spaced plates 15, 16. Except for the pivoting motion in one plane only between the horizontal bar 12 and the upright members 10 and 11 the gate is rigid against twisting forces and against side and endwise forces.

The upright members 10, 11 are provided at spaced intervals with means shown in Figures 4 and 5 to which other horizontal members, such as barbed wire 18, may be connected. The looped end of the barbed wire may extend through a hole 20 in the upright member 11. A second hole 21 extends through only one wall of the hollow pipe 11 closely adjacent to the hole 20, and a right-angle pin 22 is inserted through the loop. The angle portion of the pin 22 extends through the hole 21 and is securely held there as the barbed wire 18 is tightened up. Means are provided at the upright 10 for tightening the barbed wire 18. It comprises a threaded eye bolt 25 extending through the hollow pipe 10. The end of the wire 18 is connected to the loop 26 of the eye bolt 25, and by tightening the nut 27 the barbed wire 18 is pulled tight, thereby holding pin 22 in place in the hole 21 in the upright 11.

The upright 10 has a pair of spaced horizontal pivot plates 32 welded to it on the side opposite the upright 11. Each pivot plate has a hole in it. A gate post 35 is positioned in the ground and has secured to it a pair of spaced pivot members 37 which extend up through the holes in the pivot plates 32. Thus the upright 10 is hung on the gate post 35 and can swing with respect to it.

The weight of the upright 10 hangs on the gate post 35, but with the pivot 17 between the upright 10 and the horizontal bar 12 the weight of the upright 11 rests on the ground, as shown in Figure 1. Thus, only about one half the weight of the gate hangs on the gate post 35, and due to the fact that the outer end of the gate is at all times supported either by the ground or by someone opening the gate, there is substantially no force couple tending to pull over the gate post 35. For these reasons the gate post 35 can be made much lighter and still do an adequate job of supporting the gate.

When a person wishes to open the gate he merely lifts the outer end of the gate off of the ground and swings the gate to the desired position, where he drops it. The gate will stay in its new position until the person moves it again. Figure 2 shows the gate in its lifted position. It is to be noted that when it is lifted it foreshortens. This fact may be advantageous in making a latch for the gate post 36 at the outer end of the gate. Two spaced plates 40 may be welded or otherwise connected to either side of the gate post 36, similar to the two spaced plates 15, 16 connected to the upright member 11. In its raised position, shown in Figure 2, the upright member 11 clears the plates 40, but when it is set down on the ground the upright member 11 will be positioned between the plates 40 absolutely preventing swinging of the gate without raising the upright member 11 off of the ground.

Lifting the gate of this invention is much easier than lifting a prior art type of gate whose post has tilted, since in the first place it is possible to make the gate much lighter and in the second place the gate is deliberately made to "deform" easily. Consequently the person does not have to straighten up a leaning gate post every time he wants to open the gate, nor does he have to lift but one half the weight of the gate.

It will be seen from the previous description that it is most important to have the upright 11 rest on the ground when the gate is not being opened or closed. Supporting the weight of upright 11 on the ground reduces the tendency of the gate to pull over the gate post from a force of several hundred foot pounds to several foot pounds thereby, in effect, substantially completely eliminating the tilting of the gate post to which the gate is hinged.

For gates which are longer than about 5 feet it is preferable to provide one or more spacing members 30, secured to the horizontal member 12 by a pivot 31, and connected to the strands of barbed wire by means which permit the barbed wire to slide with respect to the spacer members 30 as the free end of the gate is raised or lowered. Thus the wire will not sag, and yet the easy up and down motion of the free end of the gate is not impaired.

The gate of the present invention has the added advantage that the purchaser of the gate can supply his own horizontal bar 12, thereby easily "tailoring" the gate to an opening in his fence. In addition to round and square pipe, a channel member may be used or a board. All the purchaser need do is measure the distance between the two properly placed upright members 10, 11 and cut a horizontal bar 12 of required length. Holes drilled through the board 12 at the proper location complete the materials for the gate. With the user supplying the horizontal bar 12 the cost of the gate may be kept at an absolute minimum since the shipping charges for the longest and heaviest member are obviated.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A gate comprising, in combination, first and second rigid upright members, hinge means connected to the first said rigid upright member for securing said upright member to a fence post, a rigid cross-member, first pivot means securing the first said upright member to one end of said cross-member and second pivot means securing the second said upright member to the other end of said cross-member forming an H-shaped frame lying in a plane and with the axes of said first and second pivot means perpendicular to said plane and with the cross-member positioned substantially mid-way between the ends of said upright members, the parts of said frame being relatively movable within said plane and rigid to movement outside of said plane, and a plurality of horizontal members pivotally connecting the first and second upright members together, a portion of said plurality of horizontal members being located to one side of said cross-member and a portion of said horizontal members being located on the other side of said cross-member.

2. The gate set forth in claim 1, further characterized by said plurality of horizontal members comprising strands of wire.

3. The gate as set forth in claim 2, further characterized by spacer means pivotally connected to said cross-member and extending substantially parallel to said upright members, and means slidably securing said horizontal strands of wire to said spacer means.

References Cited in the file of this patent

UNITED STATES PATENTS

| 158,109 | Merrill | Dec. 22, 1874 |
| 408,628 | Kelsey | Aug. 6, 1889 |
| 417,118 | Thompson | Dec. 10, 1889 |
| 700,737 | Cantrell | May 27, 1902 |
| 726,689 | Hunt | Apr. 28, 1903 |
| 748,092 | Olson | Dec. 29, 1903 |
| 1,011,548 | Wyman | Dec. 12, 1911 |
| 2,618,876 | Goode | Nov. 25, 1952 |
| 2,656,040 | Pope | Oct. 20, 1953 |

FOREIGN PATENTS

| 499,465 | Canada | Jan. 26, 1954 |